(12) United States Patent
Tsai et al.

(10) Patent No.: US 9,036,937 B2
(45) Date of Patent: May 19, 2015

(54) FAST REPEATED INTEGRAL IMAGES

(75) Inventors: Ming-Chang Tsai, San Diego, CA (US);
Pawan K. Baheti, Bangalore (IN);
Murali R. Chari, San Diego, CA (US);
Raghuraman Krishnamoorthi, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 386 days.

(21) Appl. No.: 13/230,775

(22) Filed: Sep. 12, 2011

(65) Prior Publication Data

US 2012/0230600 A1     Sep. 13, 2012

Related U.S. Application Data

(60) Provisional application No. 61/413,814, filed on Nov. 15, 2010.

(51) Int. Cl.
*G06K 9/40* (2006.01)
*G06T 5/20* (2006.01)

(52) U.S. Cl.
CPC .................................... *G06T 5/20* (2013.01)

(58) Field of Classification Search
None
See application file for complete search history.

(56) References Cited

U.S. PATENT DOCUMENTS

| | | | |
|---|---|---|---|
| 7,006,704 B2* | 2/2006 | Kobayashi et al. | 382/264 |
| 7,106,386 B2 | 9/2006 | Kobayashi | |
| 2002/0149685 A1* | 10/2002 | Kobayashi et al. | 348/252 |
| 2003/0020836 A1* | 1/2003 | Kobayashi | 348/625 |
| 2005/0196072 A1 | 9/2005 | Zhong | |
| 2009/0041373 A1 | 2/2009 | Incesu et al. | |
| 2009/0231345 A1 | 9/2009 | Bruls et al. | |
| 2010/0259689 A1* | 10/2010 | Tanaka et al. | 348/708 |

FOREIGN PATENT DOCUMENTS

| | | |
|---|---|---|
| CN | 1199474 C | 4/2005 |
| JP | 2002290772 A | 10/2002 |
| JP | 2003046810 A | 2/2003 |
| WO | 2009065441 A1 | 5/2009 |

OTHER PUBLICATIONS

Bhatia et al, Stacked Integral Image, 2010 IEEE International Conference on Robotics and Automation Anchorage Convention District May 3-8, 2010, Anchorage, Alaska, USA.*

(Continued)

*Primary Examiner* — Andrae S Allison
(74) *Attorney, Agent, or Firm* — Silicon Valley Patent Group LLP

(57) ABSTRACT

A repeated integral images method filters image data in only two passes, e.g., the first pass filters horizontal rows of pixels and a second pass filters vertical columns of pixels, or in a single pass. The filter performs at least one infinite impulse response (IIR) filter and at least one finite impulse response (FIR) filter on the image data. A plurality of IIR filters and FIR filters maybe performed to approximate a Gaussian filter. By minimizing the number of passes, the data flow between the processing unit and the storage unit is greatly reduced compared to conventional repeated integral images method thereby improving computation time.

53 Claims, 13 Drawing Sheets

(56) References Cited

OTHER PUBLICATIONS

Bhatia A., et al., "Stacked Integral Image", 2010 IEEE International Conference on Robotics and Automation : ICRA 2010; Anchorage, Alaska, USA, May 3-8, 2010, IEEE, Piscataway, NJ, USA, May 3, 2010, pp. 1530-1535, XP031743335, ISBN: 978-1-4244-5038-1, p. 1530-p. 1532.

Branislav Kisacanin Ed: "Integral Image Optimizations for Embedded Vision Applications", Image Analysis and Interpretation. 2008. SSIAI 2008. IEEE Southwest Symposium on, IEEE, Piscataway, NJ, USA, Mar. 24, 2008, pp. 181-184. XP031249234. ISBN: 978-1-4244-2296-8, p. 182-p. 183.

Ehsan S., et al.,"Novel Hardware Algorithms for Row-Parallel Integral Image Calculation", Digital Image Computing: Techniques and Applications, 2009. DICTA '09, IEEE, Piscataway, NJ, USA, Dec. 1, 2009, pp. 61-65, XP031613839, ISBN: 978-1-4244-5297-2, chapters III and IV.

International Search Report and Written Opinion—PCT/US2011/059288—ISA/EPO—Jan. 20, 2012.

* cited by examiner

FAST REPEATED INTEGRAL IMAGES

CROSS-REFERENCE TO PENDING PROVISIONAL APPLICATION

This application claims priority under 35 USC 119 to U.S. Provisional Application No. 61/413,814, filed Nov. 15, 2010 and entitled "Fast Repeated Integral Images" which is assigned to the assignee hereof and which is incorporated herein by reference.

BACKGROUND

Digital images are typically processed prior to displaying or otherwise using the images in various applications. Image processing is a form of signal processing in which the input is an image, such as a photograph or frame of view and the output is an image or parameters related to the image, which may then be used in various applications, such as computer vision, computer graphics etc. Image processing may be used to enhance the image, e.g., by removing noise, improving contrast or sharpness, etc., or to extract data from the image.

Computing a moving average is common in many applications including one-dimensional signal processing problems such as real-time acoustic echo cancellation. The moving average operation is typically a simple rectangular or boxcar filtering that is performed by adding newer samples coming into one end of the window, and subtracting older samples leaving from the other end at a step size required by the resolution of the moving average computation. The two-dimensional (2D) equivalent is typically performed by taking 2D differential among four corners of the intended spatial area, e.g., if rectangular, in an integral image. Variations of integral image exist to support rotation and non-rectangular areas when necessary. For sophistication beyond uniform 2D filters, multiple integral images can be stacked to mimic a desired filter shape with the trade-off between the cost of computational complexity and metrics such as the accuracy of filter approximation or other depending on the application. For some of the filter shapes, such as a Gaussian function, a more effective approximation is possible by repeated boxcar filtering, using integral images for computational efficiency, commonly referred to as repeated integral images method.

However, despite its accuracy, the cost of the data I/O bandwidth that results from the conventional architecture of repeated integral images method sometimes render the method unsuitable for many applications. Thus, an improved architecture for repeated integral images is desired.

SUMMARY

A repeated integral images method filters image data in only two passes, e.g., the first pass filters horizontal rows of pixels and a second pass filters vertical columns of pixels, or in a single pass. The filter performs at least one infinite impulse response (IIR) filter and at least one finite impulse response (FIR) filter on the image data. A plurality of IIR filters and FIR filters maybe performed to approximate a Gaussian filter. By minimizing the number of passes, the data flow between the processing unit and the storage unit is greatly reduced compared to conventional repeated integral images method thereby improving computation time.

In one implementation, a method of filtering an image includes receiving image data comprising an array of pixels, performing at least one infinite impulse response (IIR) filter and at least one finite impulse response (FIR) filter on a first plurality of lines of pixels in the image data that extends in a first direction and performing at least one IIR filter and at least one FIR filter on a second plurality of lines of pixels that extends in a second direction that is different than the first direction to produce a filtered image data. The filtered image data is then stored.

In another implementation, an apparatus includes a storage unit for storing image data, a data bus coupled to the storage unit, and a fast repeated integral images filter coupled to the storage unit through the data bus, the fast repeated integral images filter includes at least one infinite impulse response (IIR) filter; and at least one finite impulse response (FIR) filter coupled to the at least IIR filter. The fast repeated integral images filter is adapted to receive image data from the storage unit through the data bus, and to filter a plurality of lines of pixels in the image data that extends in a first direction with the at least one IIR filter and at least FIR filter and to filter a second plurality of lines of pixels that extends in a second direction that is different than the first direction to produce a filtered image data and to output the filtered image data to the storage unit through the data bus.

In another implementation, an apparatus includes means for receiving image data comprising an array of pixels, means for performing at least one infinite impulse response (IIR) filter and at least one finite impulse response (FIR) filter on a first plurality of lines of pixels in the image data that extends in a first direction and means for performing at least one IIR filter and at least one FIR filter on a second plurality of lines of pixels that extends in a second direction that is different than the first direction to produce a filtered image data. The apparatus further includes means for storing the filtered image data.

In yet another implementation, a computer-readable medium including program code stored thereon, includes program code to receive image data comprising an array of pixels; program code to perform at least one infinite impulse response (IIR) filter and at least one finite impulse response (FIR) filter on a first plurality of lines of pixels in image data that extends in a first direction; program code to perform at least one IIR filter and at least one FIR filter on a second plurality of lines of pixels that extends in a second direction to produce a filtered image data, the second direction being different than the first direction; and program code to store the filtered image data.

DETAILED DESCRIPTION

An efficient implementation of a fast repeated integral images method, e.g., for approximating a Gaussian filter, may be used for filtering images in applications such as computer vision, computer graphics, etc. The proposed approach minimizes computational complexity, data input/output (I/O) bandwidth, as well as cache requirement while maintaining maximum flexibility for implementation in comparison to known techniques, such as boxcar filtering, stacked integral images, and repeated integral images method.

Figure 1:
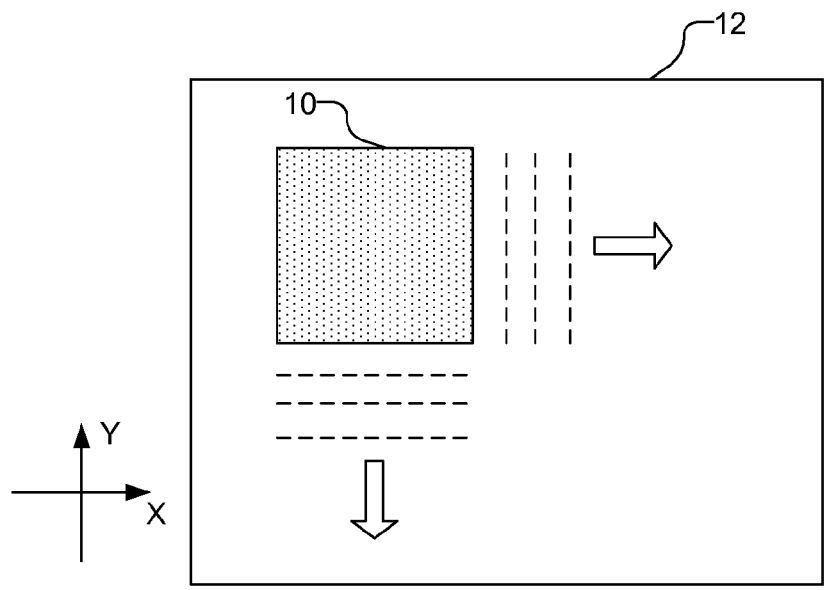
FIG. 1 illustrates a direct filtering implementation using a conventional 2D boxcar filter.

FIG. 1 illustrates a direct filtering implementation using a conventional 2D boxcar filter 10, which is commonly used by many applications either stand-alone or as foundation for more sophisticated functions. Conventional 2D boxcar filter 10 provides a moving average of an image 12. The 2D boxcar filter 10 has a width of n pixel and a height of m pixels, that moves across the image 12, in both the X and Y directions, e.g., in a raster scan, as illustrated by arrows. As the boxcar filter 10 moves across the image 12, a moving average of the pixels within the boxcar filter 10 is generated. However, computational complexity as well as memory access bandwidth for 2D boxcar filtering could be unreasonably high if implemented directly as shown in FIG. 1 given large number of redundant computation as well as memory accesses.

Figure 2:
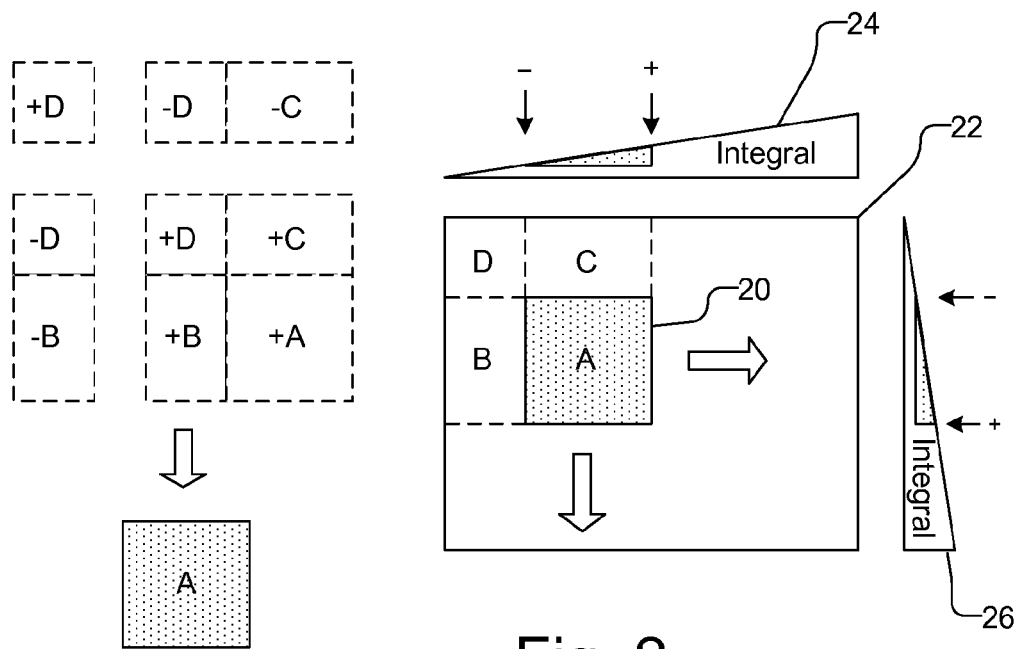
FIG. 2 illustrates a conventional filtering implementation using integral images.

FIG. 2 illustrates a conventional filtering implementation using integral images. Integral images is a more efficient implementation of 2D boxcar filtering that uses a simple differential among the four corners of the spatial area 20 of the integral image. The spatial area 20 is typically rectangular, but can be other shapes. The 2D accumulation of pixel values is generated only once. In other words, the pixels of image 22 are accumulated horizontally, as illustrated by the triangle 24, and then accumulated vertically as illustrated by triangle 26. As illustrated by the + and − signs in FIG. 2, the boxcar filtering is produced as a 2D differential among the four rectangular areas, which is moved along the horizontal axis, then along the vertical axis.

Figure 3A:
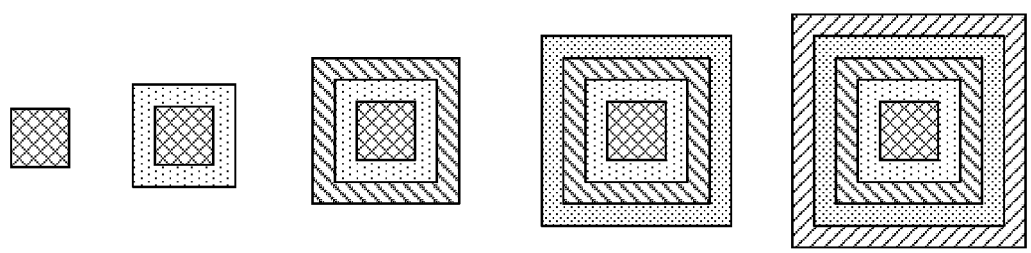
FIGS. 3A and 3B illustrate a top view and side view, respectively, of conventional 1D stacked boxcar filters.
Figure 3B:
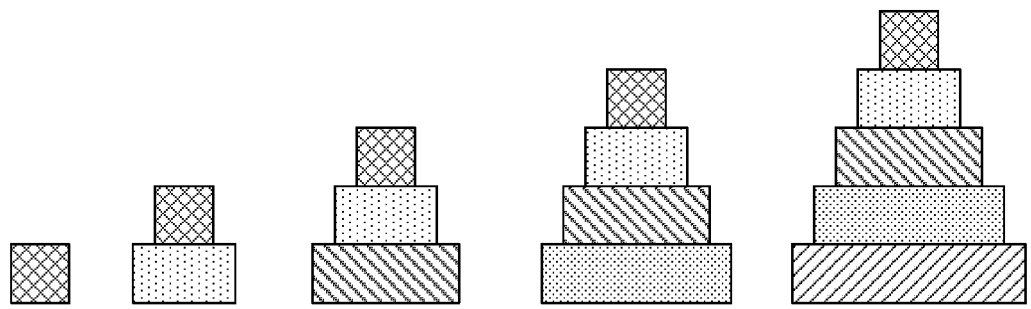

A plurality of stacked 2D boxcar filters of different sizes may be used to implement non-uniform filters, such as staircase functions, or even to approximate more sophisticated filters. To improve efficiency, stacked boxcar filtering can be extended to the integral image method shown in FIG. 2 using multiple sets of four corners, one set for each boxcar filter, referred to as stacked integral images. FIGS. 3A and 3B illustrate a top view and side view, respectively, of conventional 2D stacked boxcar filters, in which there are stacked 1, 2, 3, 4, and 5 boxcar filters, and which may be used with stacked integral images to approximate a Gaussian filter. Variations are possible, such as spatial rotation of the stack of boxcar filters, e.g., by 45°, for finer granularity in filter widths over the pixel grid, or a combination of rotation and scaling of individual boxcar filters for desired optimization depending on the requirements of applications. The approximation of the desired filter may be improved using a sufficiently large number of boxcar filters.

Figure 4:
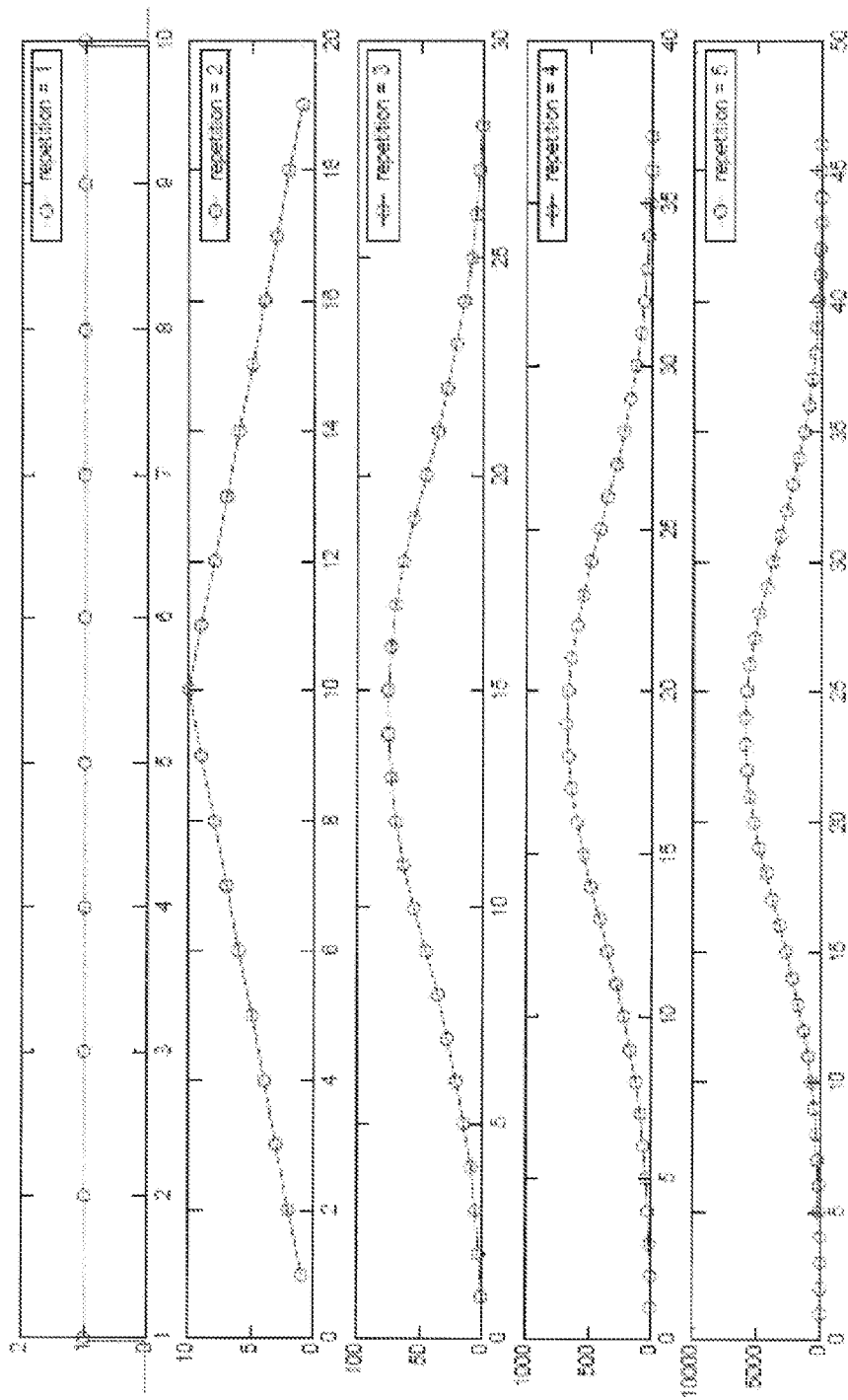
FIG. 4 illustrates the convolution of 1D boxcar filters, illustrating that with each repetition a better approximation of a Gaussian is produced.

For non-uniform filter functions, such as a Gaussian function, a more accurate approximation may be more efficiently achieved by repeatedly convolving, instead of stacking, boxcar filters as suggested by the law of large number from probability theory. FIG. 4 illustrates the convolution of 1D boxcar filters, where it can be seen with each repetition a better approximation of a Gaussian is produced.

Figure 5:
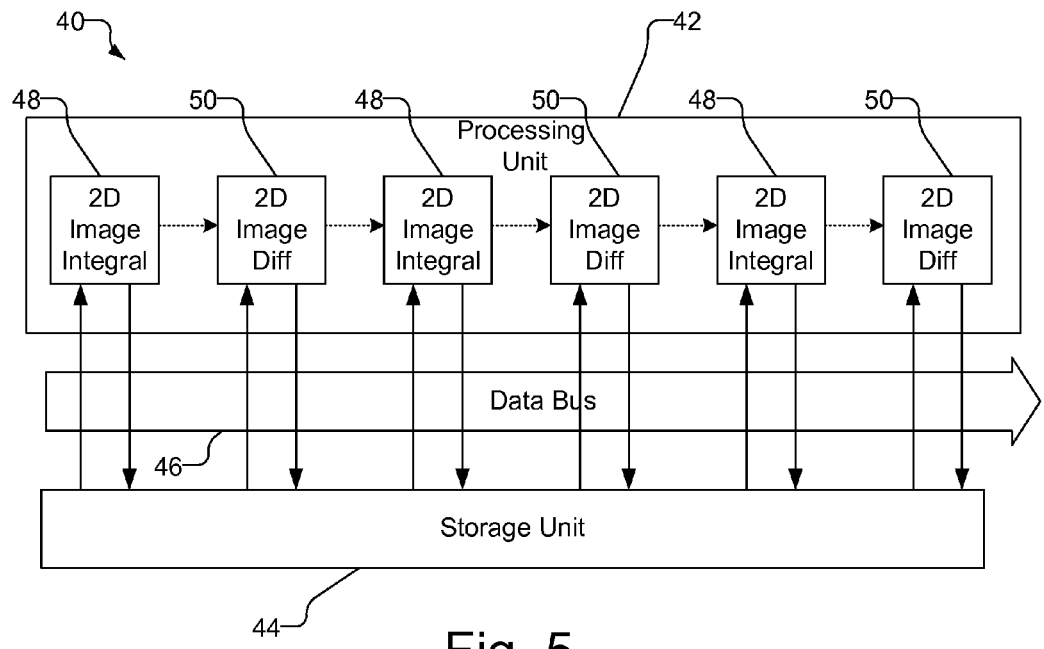
FIG. 5 is a block diagram illustrating the architecture for performing a conventional repeated integral images method.

The repeatedly convolving approach may also be used to improve efficiency of integral image method, which is commonly referred to as the repeated integral images method. Repeated integral images method differs from the stacked integral images method, in that the repeated integral images method requires one image integral per boxcar filtering. FIG. 5 is a block diagram illustrating the architecture 40 for performing a repeated integral images method for Gaussian approximation. As can be seen, the architecture 40 includes a processing unit 42 and storage unit 44, as well as a data bus 46. The processing unit 42 performs a 2D image integral 48 followed by 2D image differential 50, as described in FIG. 2, sequentially multiple times, illustrated by the dotted arrow between a plurality of 2D image integrals 48 and 2D image differentials 50. The input and output each time the 2D image integral 48 is performed and each time the 2D image differential 50 is retrieved from and provided to the storage unit 44 through data bus 46.

Using a Gaussian function approximation as a common and practical use case for comparison of direct boxcar filtering, stacked integral images and repeated integral images, the complexity of these methods is shown below in Table 1, including a computation in number of accumulations per pixel, data I/O bandwidth in number of passes of which the entire resulted image must be written out to memory for subsequent processing, and cache requirement in number of pixels that it must hold in order to fully support generation of single output pixel within any particular pass.

TABLE 1

Complexity of three approaches for Gaussian approximation

| Method | Stages | Accumulations/ Pixel | Passes | Cache |
|---|---|---|---|---|
| Direct boxcar filtering | M | $\Sigma(W_i*L_i - 1)$, $i = 1 \ldots M$ | M | $>Max(W_i*L_i)$, $i = 1 \ldots M$ |
| Stacked integral images | M | $3*M + 2$ | 2 | $>Max(W_i*L_i)$, $i = 1 \ldots M$ |
| Repeated integral images | N | $5*N$ | $2*N$ | $>Max(W_i*L_i)$, $i = 1 \ldots N$ |

Notice in Table 1 that the stacked integral images and the direct boxcar filtering methods have the same number of stages M as they are mathematically equivalent. Additionally, repeated integral images method may use fewer stages N<M, while achieving the same accuracy of approximation. For example, empirically, M is at least 6 or more if N=3. The cache requirement is the same for all three methods, where Wi and Li are the width and length of individual boxcar filters.

Based on analysis in Table 1, stacked integral images method is a better choice over direct boxcar filtering method for Gaussian approximation given the efficiency advantages in number of accumulations per pixel and the number of passes. However, the choice between stacked integral images method and repeated integral images method is not as clear given that the repeated integral images method has a moderate advantage in computation, (5*N)=(5*3)=15, over that of stacked integral images method, (3*M+2)=(3*6+2)=20, but requires a significantly greater number of passes, 2*N=2*3=6, than that of stacked integral images method, only 2. Thus, the choice between the stacked integral images method and the repeated integral images method is dependent on the cost trade-off of particular platforms, unless M>>N.

The proposed approach for fast repeated integral images method of filtering retains the nature of repeated integral images method from the viewpoint of signal processing, but utilizes an improved architecture for much more efficient operation, which requires modestly less computation and significantly less flow of data between processing unit and storage unit, as well as significantly less local storage within processing unit.

The fast repeated integral images method recognizes that the image integral is 2D infinite impulse response (IIR) filtering, which is separable as two one-dimensional (1D) IIRs. Moreover, the summation or average of a 2D rectangular region by addition and subtractions, or differential in general, among the four corners of the desired region in the integral image is a 2D finite impulse response (FIR) filtering, which is also separable as two 1D FIRs. Further, it is to be noted that a system of cascaded linear filters allow the stages of linear filters to be re-ordered, while retaining functional equivalence end-to-end. Additionally, all cascaded horizontal linear filtering stages can be performed in one single pass and all cascaded vertical linear filtering stages can also be performed in one single pass separately.

The operation of 2D image integral can be expressed as:

$$\text{out}(x, y) = \text{in}(x, y) + \text{out}(x-1, y) + \text{out}(x, y-1) - \text{out}(x-1, y-1) \quad \text{eq. 1}$$

$$\text{Out}(z_x, z_y) = \quad \text{eq. 2}$$
$$\text{In}(z_x, z_y) + \text{Out}(z_x, z_y)z_x^{-1} + \text{Out}(z_x, z_y)z_y^{-1} - \text{Out}(z_x, z_y)z_x^{-1}z_y^{-1}$$

$$\int (z_x, z_y) = \frac{\text{Out}(z_x, z_y)}{\text{In}(z_x, z_y)} = ((1-z_x^{-1})(1-z_y^{-1}))^{-1} \quad \text{eq. 3}$$

The operation of a 2D differential (e.g., spatial area 20 in FIG. 2) over an integral image can be expressed as:

$$\text{out}(x, y) = \text{in}(x, y) - \text{in}(x-W, y) - \text{in}(x, y-L) + \text{in}(x-W, y-L) \quad \text{eq. 4}$$

$$\text{Out}(z_x, z_y) = \quad \text{eq. 5}$$
$$\text{In}(z_x, z_y) - \text{In}(z_x, z_y)z_x^{-W} + \text{In}(z_x, z_y)z_y^{-L} - \text{In}(z_x, z_y)z_x^{-W}z_y^{-L}$$

$$\partial(z_x, z_y) = \frac{\text{Out}(z_x, z_y)}{\text{In}(z_x, z_y)} = (1-z_x^{-W})(1-z_y^{-L}) \quad \text{eq. 6}$$

Where W is the width of the 2D region and L is the length of the 2D region.

A single stage box filter can be expressed as:

$$\text{Boxcar}(z_x, z_y) = \quad \text{eqs. 7}$$
$$\int (z_x, z_y)\partial(z_x, z_y) = ((1-z_x^{-1})(1-z_y^{-1}))^{-1}(1-z_x^{-W})(1-z_y^{-L}) =$$

-continued
$$(1-z_x^{-1})^{-1}(1-z_y^{-1})^{-1}(1-z_x^{-W})(1-z_y^{-L}) = [(1-z_x^{-1})^{-1}$$
$$(1-z_x^{-W})][(1-z_y^{-1})^{-1}(1-z_y^{-L})] = \text{[all horizontal}$$
operations][(followed by) all vertical operations]

Repeated integral images method can be expressed as:

$$\text{Repeated}(z_x, z_y) = \prod_i \int_i (z_x, z_y) \partial_i(z_x, z_y), \quad \text{eqs. 8}$$

$$i = 1 \ldots N = \prod [(1-z_x^{-1})^{-1}(1-z_x^{-W_i})][(1-z_y^{-1})^{-1}(1-z_y^{-L_i})],$$

$$i = 1 \ldots N = \{\prod [(1-z_x^{-1})^{-1}(1-z_x^{-W_i})], i = 1 \ldots N\}$$

$$\{\prod [(1-z_y^{-1})^{-1}(1-z_y^{-L_i})], i = 1 \ldots N\} =$$

{all horizontal operations}

{(followed by) all vertical operations}

Figure 6:
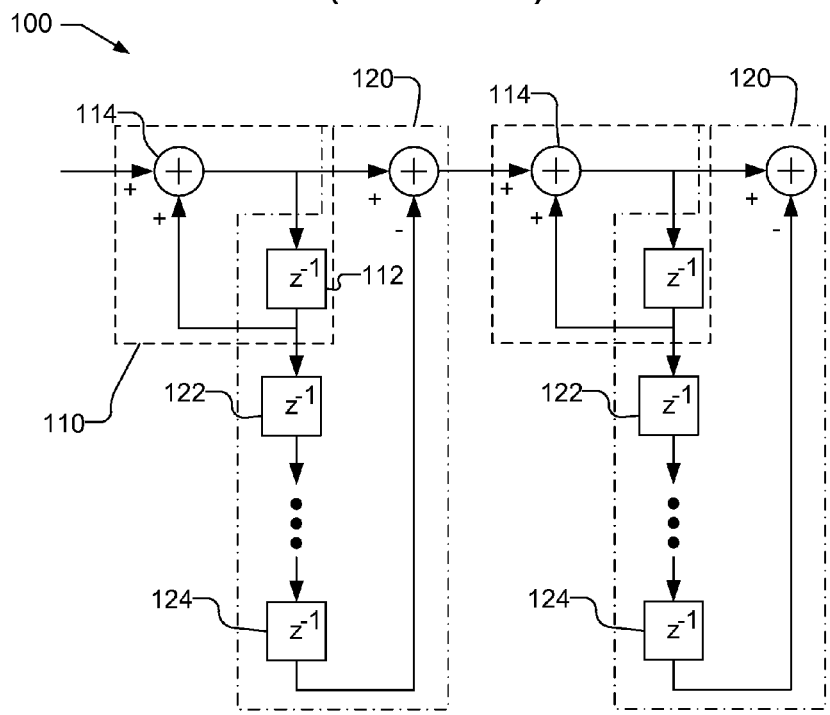
FIG. 6 illustrates one implementation of the fast repeated integral images filter.

FIG. 6 illustrates one implementation of the fast repeated integral images filter 100, which may be used for Gaussian approximation. The fast repeated integral images filter 100 includes at least one 1D infinite impulse response (IIR) filter 110 and at least one 1D finite impulse response (FIR) filter 120 coupled together. The IIR filter 110 includes, e.g., a 1-sample delay flip-flop 112 and an adder 114. The FIR filter 120 includes a plurality of 1-sample delay flip-flops 112, 122, and 124 and an adder 114 that receives the output of adder 114 from the IIR filter 110 and the inverted output of the last flip-flip 124. The number of flip-flops 112, 122, and 124 used in the FIR filter 120 is determined by the desired level of resemblance to the target filter, such as a Gaussian filter. In FIG. 6, the IIR filter 110 and FIR filter 120 set is shown repeated twice, but it should be understood that the IIR filter 110 and FIR filter 120 may be repeated as many times as desired (including zero repeats), where each repetition improves the approximation of the Gaussian. Moreover, if desired, the order of the IIR filter 110 and FIR filter 120 may be switched, i.e., the FIR filter 120 may precede the IIR filter 110. Further, the order of the filters 110 and 120 may vary between different repeating sets of filters. The use of cascaded linear filters allows the stages of linear filters to be re-ordered while retaining functional equivalence end-to-end. In operation, the horizontal lines are each passed through the fast repeated integral images filter 100 in a single pass and separately the vertical lines are each passed through the fast repeated integral images filter 100 in a single pass, assuming the differential region has the same width and length. If desired, separate cascaded linear filters may be used for the vertical lines and the horizontal lines.

Figure 7:
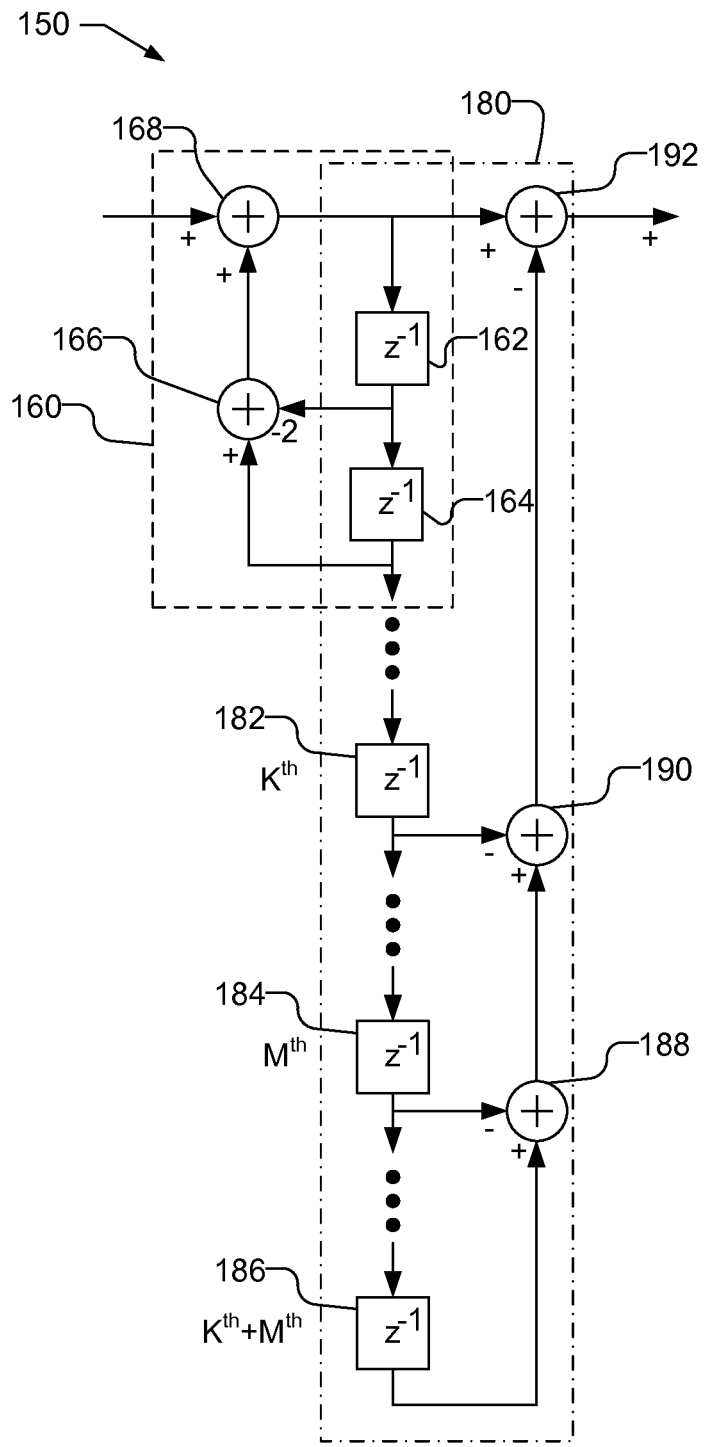
FIG. 7 illustrates another implementation of the fast repeated integral images filter.

FIG. 7 illustrates another implementation of the fast repeated integral images filter 150, which may be used for Gaussian approximation. As discussed above in reference to FIG. 6, the use of cascaded linear filters allows the stages of linear filters to be re-ordered while retaining functional equivalence end-to-end. Thus, filter 150 in FIG. 7 is functionally equivalent end-to-end with filter 100 shown in FIG. 6, but the order of the linear filters is varied. As illustrated in FIG. 7, an IIR filter 160 is produced by combining two IIR filters including two 1-sample delay flip-flops 162, 164, and two adders 166, 168, resulting in a higher-order IIR filter 160. The IIR filter 160 is in series with a single higher order FIR filter 180, which is produced by two FIR filters, including 1-sample delay flip-flops 162, 164, 182, 184, and 186, and adders 188, 190 and 192. It should be understood that if desired, an image may be filtered vertically before horizontally. Other functionally equivalent configurations of n linear IIR filters coupled to n linear FIR filters may be used.

Figure 8:
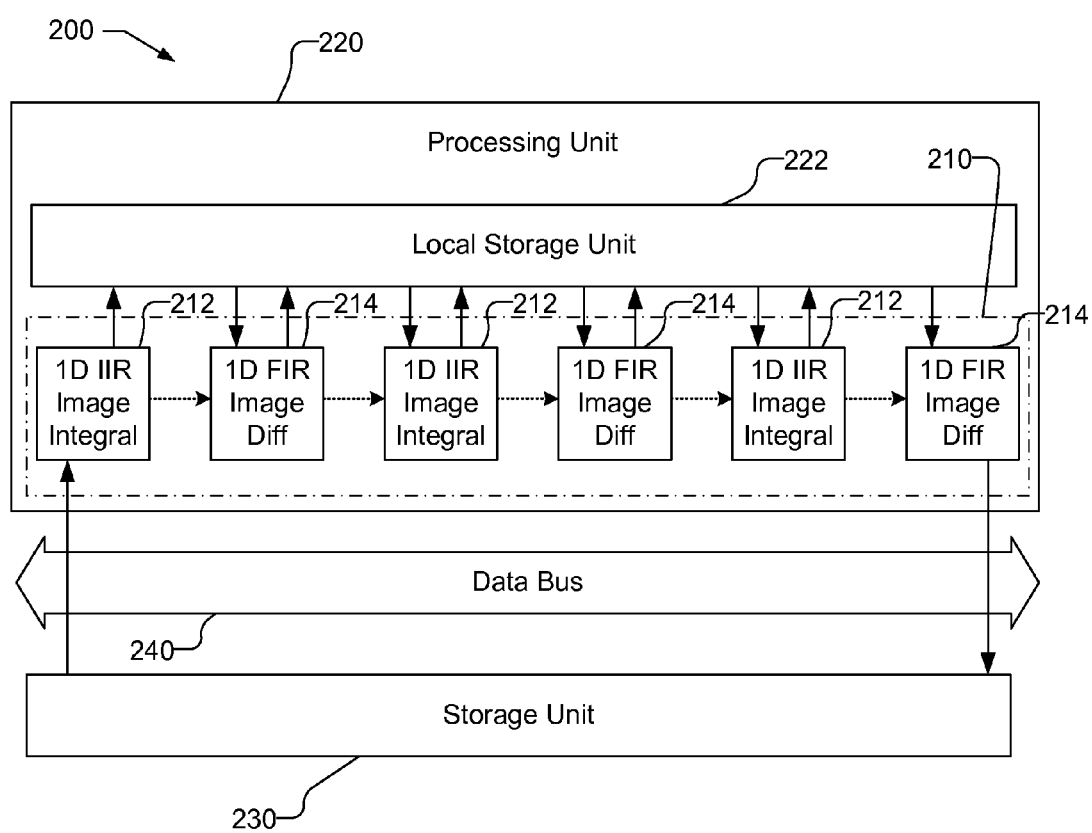
FIG. 8 is a block diagram illustrating the architecture for the fast repeated integral images filter shown in FIG. 6.

FIG. 8 is a block diagram illustrating the architecture 200 for a multi stage fast repeated integral images filter 210, similar to that shown in FIG. 6. The architecture 200 includes a processing unit 220, which is illustrated as performing the fast repeated integral images filter 210, a storage unit 230, as well as a data bus 240. In operation, an image is input to the fast repeated integral images filter 210 from the storage unit 230, through data bus 240, only once and a filtered image is output from the fast repeated integral images filter 210 to the storage unit 230, through data bus 240, only once. The fast repeated integral images filter 210 is used twice, once to filter an image in the horizontal dimension and a second time to filter the image in the vertical dimension. If desired, two separate fast repeated integral images filters 210 may be used to process the horizontal dimension and the vertical dimension sequentially. The fast repeated integral images filter 210 includes a 1D IIR image integral (sometimes referred to as IIR filter) 212 and by a 1D FIR image differential (sometimes referred to as FIR filter) 214, as described in FIGS. 6 and 7, which sequentially filter the image multiple times, as illustrated by the dotted arrow between the plurality of IIR filters 212 and FIR filters 214. Each IIR filter 212 and FIR filter 214 are coupled to a local storage 222 in the processing unit 220. The dotted arrows between the IIR filters 212 and FIR filters 214 illustrate the flow of the process as opposed to a direct connection. As described above, the order as well as the number of IIR filters 212 and FIR filters 214 may be varied if desired.

The architecture 200 and method 300 for the fast repeated integral images filter provides a more efficient operation for repeated integral images, as illustrated in Table 2 below which shows the complexity of repeated integral images and fast repeated integral images for Gaussian approximation.

TABLE 2

Complexity of four approaches for Gaussian approximation

| Method | Stages | Accumulations/ Pixel | Passes | Cache |
|---|---|---|---|---|
| Repeated integral images | N | 5*N | 2*N | >Max(Wi*Li), i = 1 ... N |
| (1D) Fast Repeated Integral Images | N | 4*N | 2 | >Max(Wi, Li), i = 1 ... N |
| (2D) Single Pass Fast Repeated Integral Images | N | 4*N | 1 | SUM(Li)*Image Row Width, i = 1 ... N |

As can be seen, in comparison to a conventional repeated integral images method, the computational complexity reduction with the fast repeated integral images method is about 25% going from (5*N) to (4*N), but there is significant reduction in the number of passes from (2*N) to 2. Thus, the fast repeated integral images method is clearly a better choice than the stacked integral images method (shown in Table 1) for advantages in computational complexity, while requiring no additional passes or greater cache requirement.

The advantages of fast repeated integral images method and architecture over conventional methods and architecture for repeated integral images method include (1) lower computational complexity, (2) much lower requirement for data flow between processing unit and storage unit, (3) much lower requirement for local data storage within processing unit, (4) fundamentally better choice instead of by making different trade-off among computation, data flow, and local storage, (5) easily extendible to operation in higher dimensional space or for higher order of repeated integral images.

Figure 9:
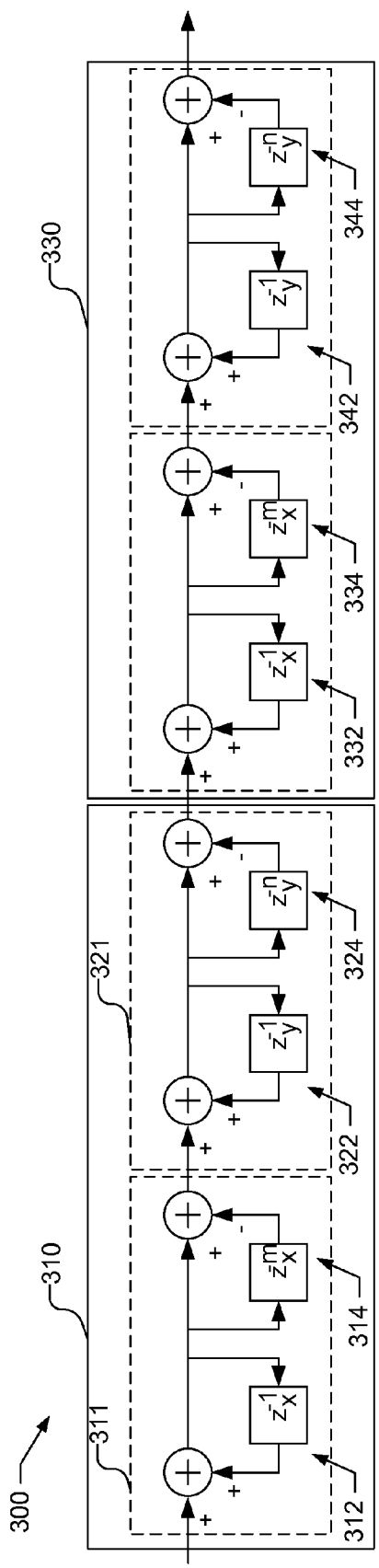
FIG. 9 illustrates an implementation of a two dimensional fast repeated integral images filter.

If desired, the fast repeated integral images filter may be performed in a single pass, i.e., filtering in two dimensions, as opposed to two passes as required by a one dimension filter. FIG. 9 illustrates an implementation of a 2D fast repeated integral images filter 300. The fast repeated integral images filter 300 is illustrated as including a cascade of two stages 310 and 330, but fewer or additional stages may be used if desired. As illustrated, the first stage 310 is divided into a horizontal portion 311, which filters rows of pixels in the x direction, and a vertical portion 321 that filters columns of pixels in the y direction. The horizontal portion 311 of the first stage 310 includes an IIR filter 312 coupled to an FIR filter 314, which has a filter width of m. The vertical portion 321 of the first stage 321 includes an IIR filter 322 coupled to an FIR filter 324, which has a filter width of n. The second stage 330 similarly includes IIR filters 332 and 342 for the rows and columns of pixels, respectively, and FIR filters 334 and 344 for the rows and columns of pixels, respectively.

Figure 10:
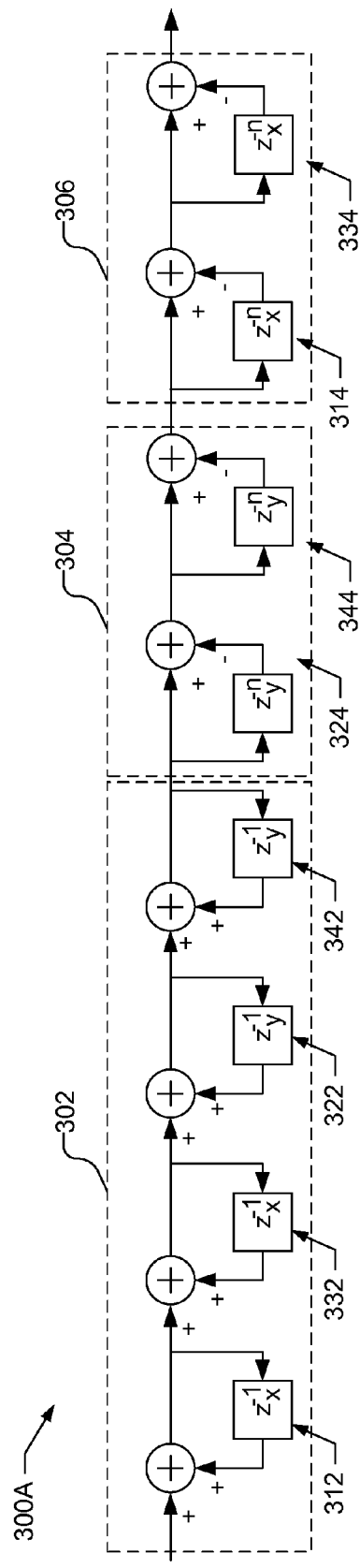
FIG. 10 illustrates another implementation of a two dimensional fast repeated integral images filter.

As discussed above, the order of the IIR filters and FIR filters may be varied. For example, as illustrated in FIG. 10, a modified 2D fast repeated integral images filter 300A cascades all the IIR filters 312, 322, 332, 342 together in a common IIR stage 302, as these are independent of the FIR operations. The FIR filters may be grouped into a vertical stage 304, including FIR filters 324 and 344, and a horizontal stage 306, including FIR filters 314 and 334.

Figure 11:
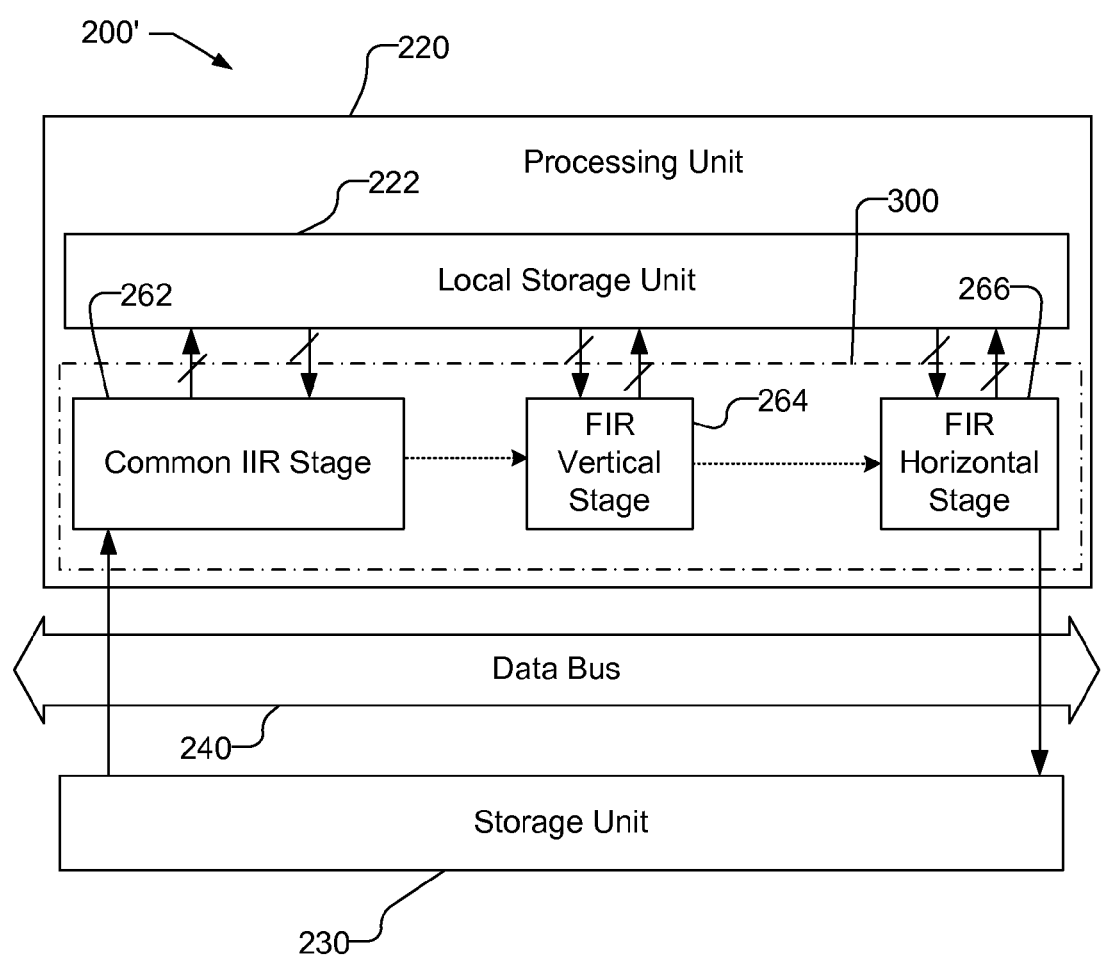
FIG. 11 is a block diagram illustrating the architecture for a 2D fast repeated integral images filter, such as that shown in FIG. 10.

FIG. 11 is a block diagram illustrating the architecture 200' for a 2D fast repeated integral images filter 300, such as that shown in FIG. 10. Similar to the architecture 200 described in FIG. 8, the architecture 200' includes a processing unit 220, which is illustrated as performing the 2D fast repeated integral images filter 300, a storage unit 230, as well as a data bus 240. In operation, an image is input to the 2D fast repeated integral images filter 300 from the storage unit 230, through data bus 240, only once and a filtered image is output from the 2D fast repeated integral images filter 300 to the storage unit 230, through data bus 240 only once. Additionally, the 2D fast repeated integral images filter 300 is used in one pass to filter the image in both the horizontal dimension and the vertical dimension. The fast repeated integral images filter 300 is illustrated as including the common IIR stage 262, as well as the FIR vertical stage 264 and FIR horizontal stage 266, as describe in FIG. 10, and which sequentially filter the image one or more times, as illustrated by the dotted arrow which show the flow of the process as opposed to a direct connection. Each IIR filter and FIR filter in the common IIR stage 262, FIR vertical stage 264 and FIR horizontal stage 266 is coupled to a local storage unit 222 in the processing unit 220. As described above, the order as well as the number of IIR filters and FIR filters may be varied if desired and thus, may not be grouped in the common IIR stage 262, FIR vertical stage 264 and FIR horizontal stage 266 as illustrated in FIG. 11.

The implementation of the 2D fast repeated integral images filter reduces complexity and requires 7×-8× less operations than conventional implementation of convolution with a 2D Gaussian filter. The implementation of the 2D fast repeated integral images filter, however, requires additional local storage relative to the 1D fast repeated integral images filter as described in Table 2 above. The amount of local storage for implementation of the 2D fast repeated integral images filter with K stages and FIRs of length $M_1, M_2, \ldots M_K$ includes 1 row for each IIR filter for a total of K rows, where the bit width of the IIRs is determined by the maximum length of the FIRs that follow, and $M_1, M_2, \ldots M_K$ rows for intermediate output storage of the FIRs.

Figure 12:
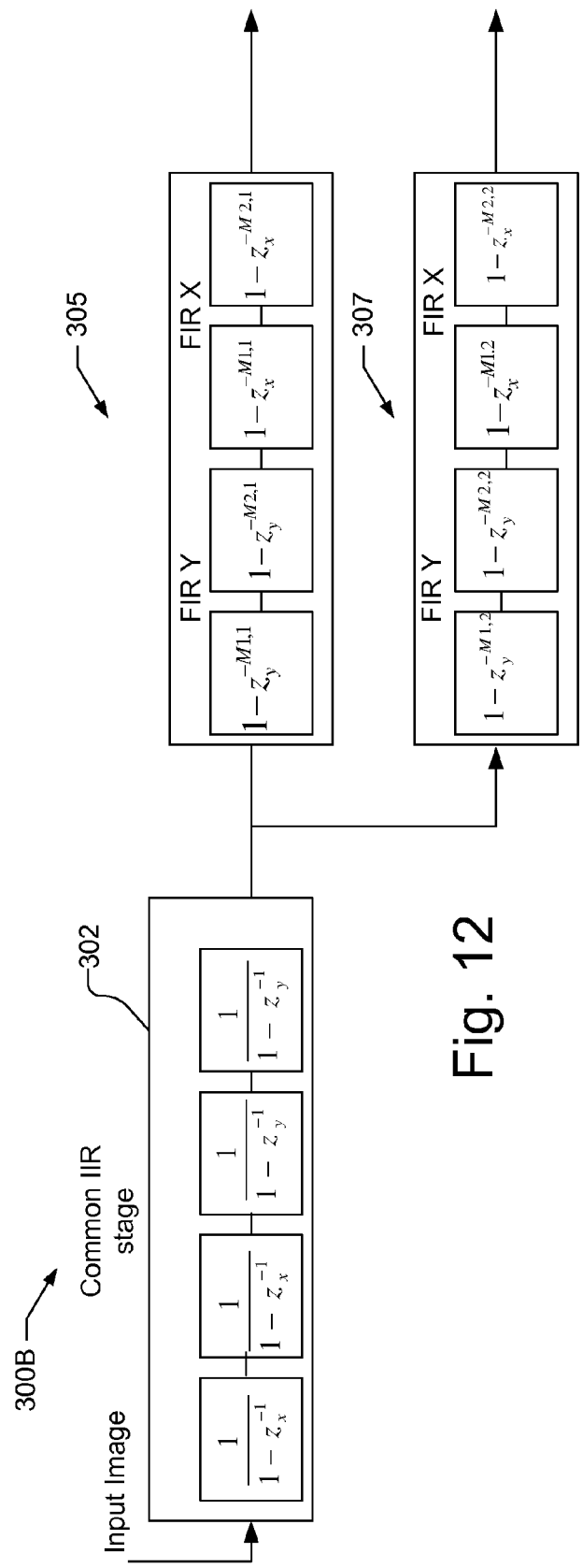
FIG. 12 illustrates another implementation of a two dimensional fast repeated integral images filter.
Figure 13:
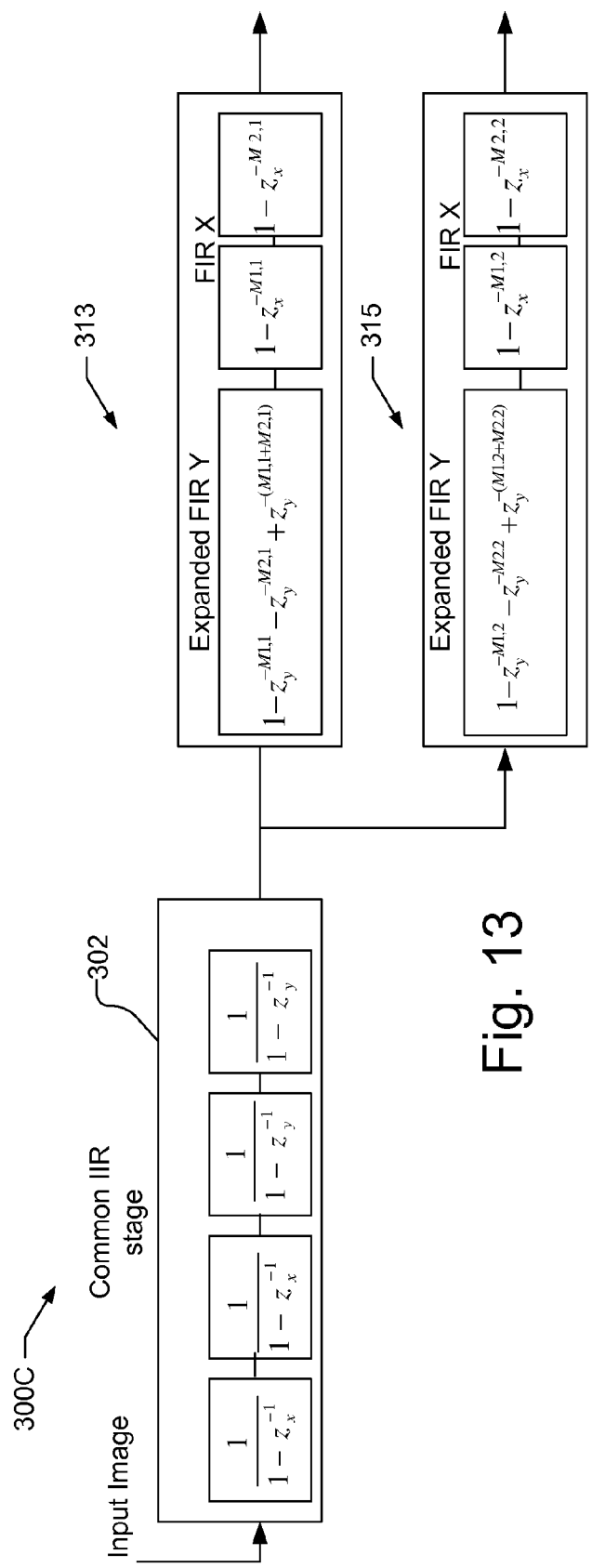
FIG. 13 illustrates another implementation of a two dimensional fast repeated integral filter with an expanded FIR filter.

As illustrated in FIG. 12, the 2D fast repeated integral images filter 300B, similar to that shown in FIG. 10, may include a single common IIR stage 302 and multiple FIR filter banks 305 and 307. With multiple FIR filter banks sharing the same common IIR stage 302, different types of box filters may be implemented without requiring repeating of the IIR filter process, thereby reducing processing time. Moreover, as illustrated in FIG. 13, another implementation of the 2D fast repeated integral images filter 300C, similar to that shown in FIG. 12, includes within FIR filter banks 313 and 315 a single longer FIR filter, i.e., expanded FIR Y, which is used in place of multiple FIR Y filters, shown in FIG. 12. The use of expanded FIR filters within the FIR filter banks 313 and 315 is advantageous as it reduces the local storage requirements.

Figure 14:
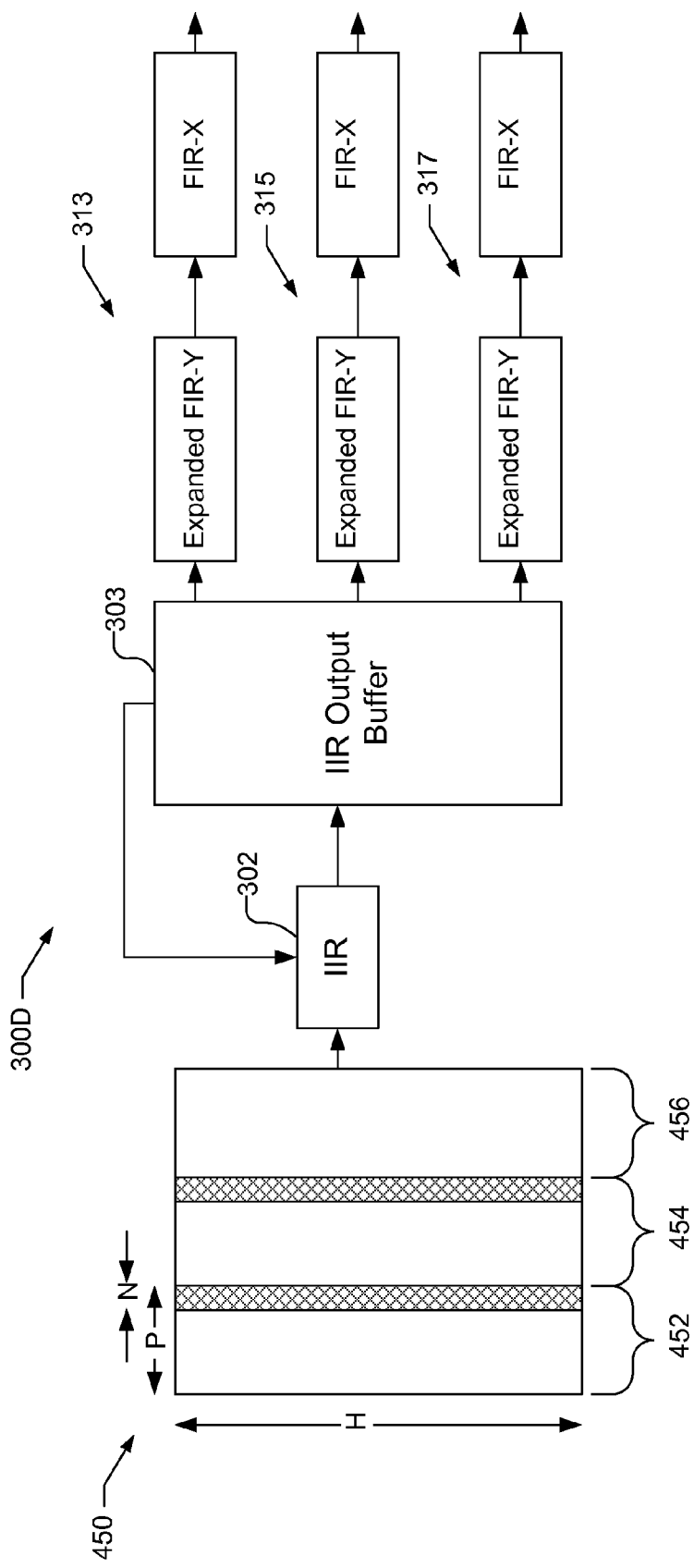
FIG. 14 illustrates an image divided into multiple stripes that may be separately processed by the two dimensional fast repeated integral images filter.

Additionally, the 2D fast repeated integral images filter may divide an image with a plurality of stripes so that the local storage requirements are independent of image size and there is a fixed cost per pixel in terms of arithmetic complexity. FIG. 14 illustrates a striped image 450 and a 2D fast repeated integral images filter 300D capable of processing the striped image 450.

As illustrated in FIG. 14, the striped image is divided into multiple vertically oriented stripes 452, 454, and 456, so that each tile has the same number of rows of pixels but each tile has fewer columns of pixels than are present in the full image 450. As illustrated, the stripes 452, 454, and 456 have a width of P columns and a height H. A portion of the width of columns 452 and 454 is identified as overhead N, which is equal to the maximum filter length in the IIR stage 302.

The 2D fast repeated integral images filter 300D shown in FIG. 14 includes an IIR Output Buffer 303, but otherwise may be similar to previously described 2D fast repeated integral images filters. FIG. 14 also shows the inclusion of an additional FIR bank 317, but fewer or additional FIR banks may be used. The 2D fast repeated integral images filter 300D processes each stripe separately, i.e., both the horizontal width and height of the stripe, before moving to the next stripe, which is advantageous as it reduces the required size of the local storage unit 322 (shown in FIG. 11). The required cache size is the product of the stripe width P plus the overhead N from any previous stripe, and the height required for the FIR computation, i.e., maximum filter length*(P+N). In order to filter subsequent stripes, e.g., stripes 454 and 456, the 2D fast repeated integral images filter 300D requires information from the preceding stripe, which is the overhead N. Thus, additional memory accesses in the amount of N samples/row/block is provided by the IIR Output Buffer 303. The 2D fast repeated integral images filter 300D is considered a single pass filter even though multiple stripes are sequentially filtered as the data is from the image is read once from each location of the image. The size of P is chosen so that N/P is small. For example, choosing P=80 and N=25, the extra overhead in memory access is 30%, i.e., execution time is increased by 30%. With P=80, however, the required cache size of the local storage unit 372, is less than 20 kB and is independent of the image size.

Figure 15:
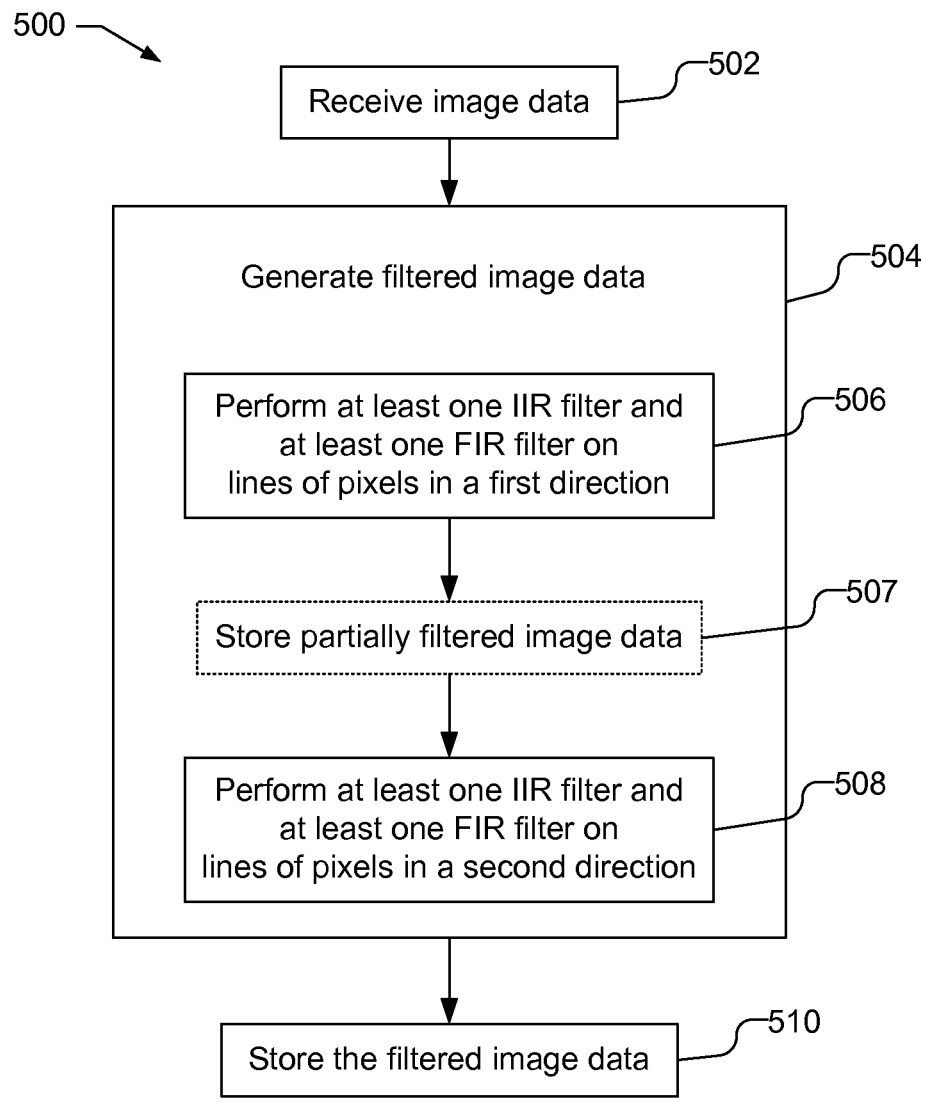
FIG. 15 is a flow chart illustrating the operation of the fast repeated integral images filter.

FIG. 15 is a flow chart illustrating the method 500 of the fast repeated integral images filter. As illustrated, image data that includes an array of pixels is received by the fast repeated integral images filter (502). The image data is filtered by the fast repeated integral images filter to generate filtered image data (504). The filtered image data is generated by performing at least one IIR filter and at least one FIR filter on a plurality of lines of pixels (e.g., rows of pixels) in the image data that extend in the first direction (506). The filtered image data is further generated by performing at least one at least one IIR filter and at least one FIR filter on a plurality of the lines of pixels (e.g., columns of pixels) that extend in the second direction thereby producing the filtered image data (508). The filtered image data is output and stored, e.g., in the storage unit, e.g., storage unit 230 (510). The generation of the filtered image data (504) may be performed in two passes, e.g., using 1D fast repeated integral images filter 210. For example, performing at least one at least one IIR filter and at least one FIR filter on the lines of pixels in the first direction (506), produces partially filtered image data, which is provided to and stored, e.g., in the storage unit 230 (507) and retrieved prior to performing the IIR filter and FIR filter on the lines of pixels in the second direction in the partially filtered image data (508). All of the lines may be filtered in the first direction before filtering all of the lines in the second direction and, thus, communication with the storage unit 230 is minimized. If desired, however, if desired, a subset of lines may be filtered at a time, which will require additional passes.

Alternatively, the generation of the filtered image data (504) may be performed in a single pass, e.g., using the 2D fast repeated integral images filters described above, in which case step 507 is unnecessary. Additionally, if the 2D fast repeated integral images filter is used to generate the filtered image data, the image data may be striped so that multiple portions of the image are sequentially filtered, as discussed above, in which case certain portions of the striped image (e.g., overhead N) are filtered twice resulting in additional overhead.

Figure 16:
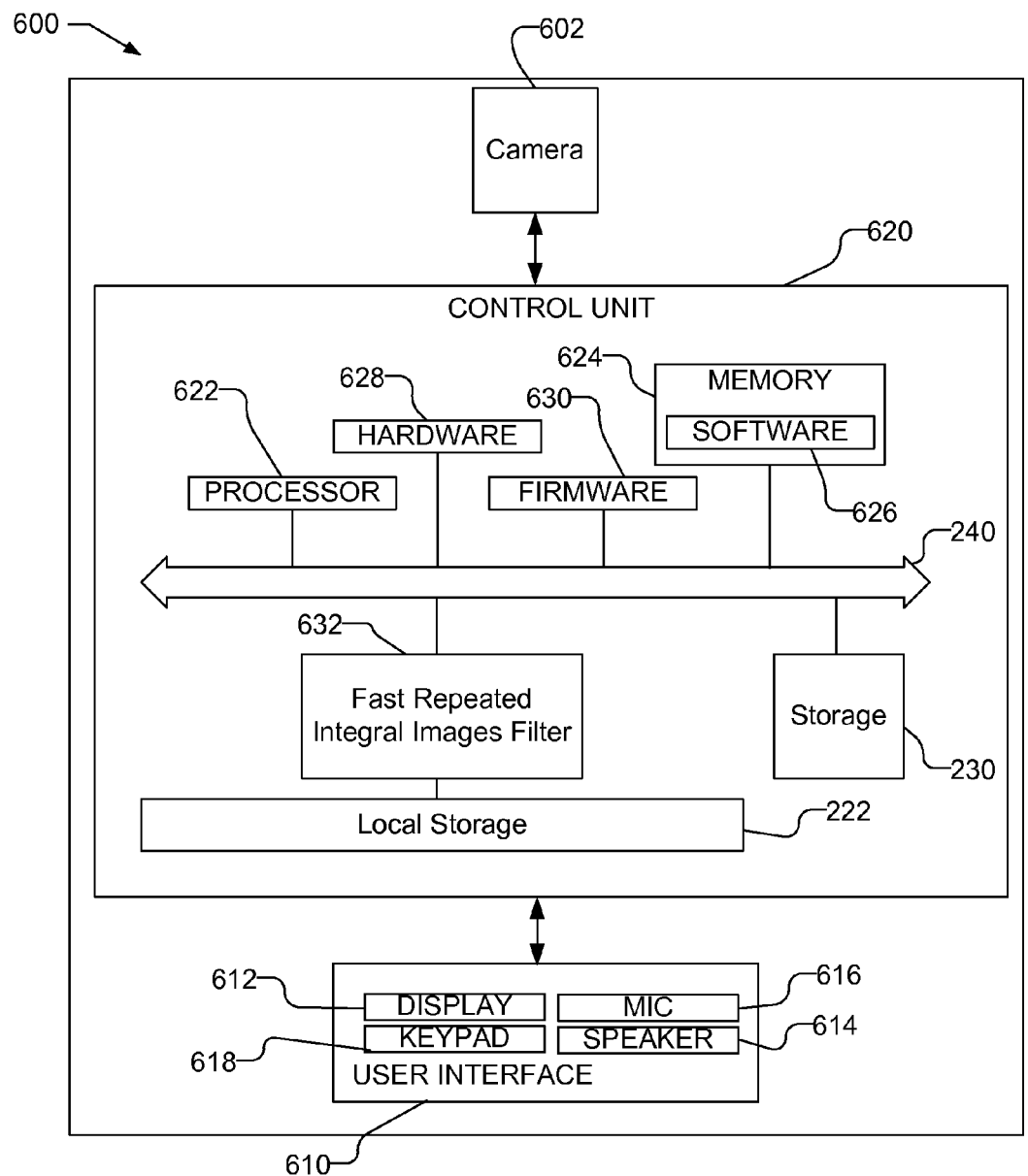
FIG. 16 illustrates a block diagram of a mobile platform which is capable performing the fast repeated integral images method.

The fast repeated integral images method may be performed by any apparatus with the appropriate architecture. By way of example, FIG. 16 illustrates a block diagram of a mobile platform 600 which is capable performing the fast repeated integral images method. A mobile platform refers to any portable electronic device such as a cellular or other wireless communication device, personal communication system (PCS) device, personal navigation device (PND), Personal Information Manager (PIM), Personal Digital Assistant (PDA), or other suitable mobile device. The fast repeated integral images method may be performed in devices that stationary or partially stationary as well.

The mobile platform 600 is illustrated as including a camera 602, which is capable of capturing images of video frames to be filtered. The mobile platform 600 also includes a user interface 610 that includes the display 612, e.g., capable of displaying images captured by the camera 602. The user interface 610 may also include a keypad 618 or other input device through which the user can input information into the mobile platform 600. If desired, the keypad 618 may be obviated by integrating a virtual keypad into the display 612 with a touch sensor. The user interface 610 may also include a microphone 616 and speaker 614, e.g., if the mobile platform is a cellular telephone. Of course, mobile platform 600 may include other elements unrelated to the present disclosure.

The mobile platform 600 also includes a control unit 620 that is connected to and communicates with the camera 602 and user interface 610, along with other features. The control unit 620 may be provided by a processor 622 and associated memory/storage 624, which may include software 626, as well as hardware 628, and firmware 630. The mobile platform 600 is illustrated as including a fast repeated integral images filter 632, which may be any of the 1D fast repeated integral images filters or any of the 2D fast repeated integral images filters described above, and which is coupled to local storage 222 and coupled to storage unit 230 through the data bus 240. The fast repeated integral images filter 632 is illustrated separately from processor 622 for clarity, but may be implemented in the processor 622 based on instructions in the software 626 which is run in the processor 622. It will be understood as used herein that the processor 622, as well as the fast repeated integral images filter 632 can, but need not necessarily include, one or more microprocessors, embedded processors, controllers, application specific integrated circuits (ASICs), digital signal processors (DSPs), and the like. The term processor is intended to describe the functions implemented by the system rather than specific hardware. Moreover, as used herein the terms "memory" and "storage" refers to any type of computer storage medium, including long term, short term, or other memory associated with the mobile platform, and is not to be limited to any particular type of memory or number of memories, or type of media upon which memory is stored.

The methodologies described herein may be implemented by various means depending upon the application. For example, these methodologies may be implemented in hardware 628, firmware 630, software 626, or any combination thereof. For a hardware implementation, the fast repeated integral images filter 632 may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, electronic devices, other electronic units designed to perform the functions described herein, or a combination thereof.

For a firmware and/or software implementation, the methodologies may be implemented with modules (e.g., procedures, functions, and so on) that perform the functions described herein. Any machine-readable medium tangibly embodying instructions may be used in implementing the methodologies described herein. For example, software codes may be stored in memory 624 and executed by the processor 622. Memory may be implemented within or external to the processor 622.

If implemented in firmware and/or software, the functions may be stored as one or more instructions or code on a computer-readable medium. Examples include non-transitory computer-readable media encoded with a data structure and computer-readable media encoded with a computer program. Computer-readable media includes physical computer storage media. A storage medium may be any available medium that can be accessed by a computer. By way of example, and not limitation, such computer-readable media can comprise RAM, ROM, Flash Memory, EEPROM, CD-ROM or other optical disk storage, magnetic disk storage or other magnetic storage devices, or any other medium that can be used to store desired program code in the form of instructions or data structures and that can be accessed by a computer; disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

Although the present invention is illustrated in connection with specific embodiments for instructional purposes, the present invention is not limited thereto. Various adaptations and modifications may be made without departing from the scope of the invention. Therefore, the spirit and scope of the appended claims should not be limited to the foregoing description.

What is claimed is:

1. A method of filtering an image comprising:
    receiving image data comprising an array of pixels;
    performing repeated integral image filtering on the image data, wherein the repeated integral image filtering comprises:
        performing at least one infinite impulse response (IIR) filter and at least one finite impulse response (FIR) filter on a first plurality of lines of pixels in the image data that extends in a first direction, and
        performing at least one IIR filter and at least one FIR filter on a second plurality of lines of pixels that extends in a second direction that is different than the first direction to produce a filtered image data; and
    storing the filtered image data.

2. The method of claim 1, wherein the filtered image data approximates a Gaussian filtered image data.

3. The method of claim 1, wherein performing the at least one IIR filter and the at least one FIR filter on the first plurality of lines of pixels in the image data produces a partially filtered image data, the method further comprising storing the partially filtered image data, and wherein performing the at least one IIR filter and the at least one FIR filter on the second plurality of lines of pixels is on the partially filtered image data.

4. The method of claim 3, wherein:
    performing the at least one IIR filter and the at least one FIR filter on the first plurality of lines of pixels comprises performing the at least one IIR filter and the at least one FIR filter on all lines of pixels in the image data that extend in the first direction before storing the partially filtered image data; and
    performing the at least one IIR filter and the at least one FIR filter on the second plurality of lines of pixels comprises performing the at least one IIR filter and the at least one FIR filter on all lines of pixels in the filtered image data that extend in the second direction before storing the filtered image data.

5. The method of claim 1, wherein:
    performing the at least one IIR filter and the at least one FIR filter on the first plurality of lines of pixels comprises performing a plurality of IIR filters and a plurality of FIR filters on the first plurality of lines of pixels; and
    performing the at least one IIR filter and the at least one FIR filter on the second plurality of lines of pixels comprises performing a plurality of IIR filters and a plurality of FIR filters on the second plurality of lines of pixels.

6. The method of claim 5, further comprising locally storing an output of each of the plurality of IIR filters and each of the plurality of FIR filters in a local storage unit that is different than a storage unit for storing the filtered image data.

7. The method of claim 5, wherein:
    performing the plurality of IIR filters and the plurality of FIR filters on the first plurality of lines of pixels comprises performing an equal number of IIR filters and FIR filters; and
    performing the plurality of IIR filters and the plurality of FIR filters on the second plurality of lines of pixels comprises performing a second equal number of IIR filters and FIR filters.

8. The method of claim 5, wherein:
    performing the plurality of IIR filters and the plurality of FIR filters on the first plurality of lines of pixels comprises performing the plurality of IIR filters and the plurality of FIR filters serially; and performing the plurality of IIR filters and the plurality of FIR filters on the second plurality of lines of pixels comprises performing the plurality of IIR filters and the plurality of FIR filters serially.

9. The method of claim 5, wherein:

performing the plurality of IIR filters and the plurality of FIR filters on the first plurality of lines of pixels comprises combining a plurality of parallel IIR filters into a single higher-order IIR filter and combining a plurality of parallel FIR filters into a single higher-order FIR filter and performing the single higher-order IIR filter and the single higher-order FIR filter serially.

10. The method of claim 9, wherein the single higher-order IIR filter is performed before the single higher-order FIR filter.

11. The method of claim 5, wherein performing the plurality of IIR filters and the plurality of FIR filters on the first plurality of lines of pixels and performing the plurality of IIR filters and the plurality of FIR filters on the second plurality of lines of pixels comprises performing the plurality of IIR filters on the first plurality of lines of pixels and the plurality of IIR filters on the second plurality of lines of pixels in a common IIR stage before performing the plurality of FIR filters on the first plurality of lines of pixels and performing the plurality of FIR filters on the second plurality of lines of pixels.

12. The method of claim 11, wherein performing the plurality of FIR filters on the second plurality of lines of pixels occurs before performing the plurality of FIR filters on the first plurality of lines of pixels.

13. The method of claim 11, further comprising performing a second plurality of FIR filters on the first plurality of lines of pixels and performing a second plurality of FIR filters on the second plurality of lines of pixels after the common IIR stage.

14. The method of claim 1, wherein performing the plurality of IIR filters and the plurality of FIR filters on the first plurality of lines of pixels produces a partially filtered image data, the method further comprising storing the partially filtered image data, and wherein the plurality of IIR filters and the plurality of FIR filters on the second plurality of lines of pixels is performed on the partially filtered image data.

15. The method of claim 1, wherein performing the at least one IIR filter and the at least one FIR filter on the first plurality of lines of pixels comprises performing the at least one IIR filter before performing the at least one FIR filter.

16. The method of claim 1, wherein performing the at least one IIR filter and the at least one FIR filter on the first plurality of lines of pixels in the image data and performing the at least one IIR filter and the at least one FIR filter on the second plurality of lines of pixels is performed in a single pass.

17. The method of claim 16, wherein the image data comprises a first number of rows of pixels and a second number of columns of pixels, the method further comprising:

dividing the image data into a plurality of stripes, each stripe comprising the first number of rows of pixels and a third number of columns of pixels that is less than the second number of columns, wherein the at least one IIR filter and the at least one FIR filter on the first plurality of lines of pixels in the image data and the at least one IIR filter and the at least one FIR filter on the second plurality of lines of pixels are performed on each of the plurality of stripes sequentially.

18. An apparatus comprising:
storage unit for storing image data;
a data bus coupled to the storage unit;
a fast repeated integral images filter coupled to the storage unit through the data bus, the fast repeated integral images filter comprising:
at least one infinite impulse response (IIR) filter; and
at least one finite impulse response (FIR) filter coupled to the at least one IIR filter;
wherein the fast repeated integral images filter is adapted to receive the image data from the storage unit through the data bus, and to filter a plurality of lines of pixels in the image data that extends in a first direction with the at least one IIR filter and the at least one FIR filter and to filter a second plurality of lines of pixels that extends in a second direction that is different than the first direction to produce a filtered image data and to output the filtered image data to the storage unit through the data bus.

19. The apparatus of claim 18, wherein the filtered image data approximates a Gaussian filtered image data.

20. The apparatus of claim 18, wherein the fast repeated integral images filter is adapted to filter the plurality of lines of pixels in the image data that extends in the first direction with the at least one IIR filter and the at least one FIR filter to produce a partially filtered image data and to output the partially filtered image data to the storage unit through the data bus and wherein the fast repeated integral images filter is adapted to receive the partially filtered image data from the storage unit and to filter the second plurality of lines of pixels in the partially filtered image data that extends in the second direction.

21. The apparatus of claim 20, wherein the fast repeated integral images filter is adapted to filter all of the plurality of lines of pixels in the image data that extend in the first direction to produce the partially filtered image data and to filter all of the plurality of lines of pixels in the partially filtered image data that extend in the second direction to produce the filtered image data.

22. The apparatus of claim 18, wherein the fast repeated integral images filter comprises:
a plurality of IIR filters; and
a plurality of FIR filters coupled to the plurality of IIR filters.

23. The apparatus of claim 22, further comprising a local storage unit, wherein the plurality of IIR filters are directly coupled to the local storage unit and the plurality of FIR filters are directly coupled to the local storage unit.

24. The apparatus of claim 22, wherein there are an equal number of IIF filters and FIR filters in the plurality of IIR filters and the plurality of FIR filters.

25. The apparatus of claim 22, wherein the plurality of IIR filters and the plurality of FIR filters are coupled in series.

26. The apparatus of claim 22, wherein the plurality of IIR filters comprises a plurality of parallel IIR filters combined into a single higher-order IIR filter and the plurality of FIR filters comprises a plurality of parallel FIR filters combined into a single higher-order FIR filter, wherein the single higher-order IIR filter is coupled in series with the single higher-order FIR filter.

27. The apparatus of claim 26, wherein the single higher-order IIR filter is coupled to receive the image data stored in the storage unit through the data bus and the single higher-order FIR filter is coupled to output a partially filtered image data to the storage unit through the data bus.

28. The apparatus of claim 22, wherein the fast repeated integral images filter is adapted to filter the plurality of lines of pixels that extends in the first direction and to filter the second plurality of lines of pixels that extends in the second direction with the plurality of IIR filters and the plurality of FIR filters in a single pass.

29. The apparatus of claim 28, wherein the image data comprises a first number of rows of pixels and a second number of columns of pixels, the image data being divided into a plurality of stripes, each stripe comprising the first number of rows of pixels and a third number of columns of pixels that is less than the second number of columns, wherein the fast repeated integral images filter is adapted to filter the plurality of lines of pixels that extends in the first direction and to filter the second plurality of lines of pixels that extends in the second direction in each of the plurality of stripes sequentially.

30. The apparatus of claim 22, wherein the plurality of IIR filters are grouped in a common IIR stage before the plurality of FIR filters.

31. The apparatus of claim 30, further comprising a vertical FIR stage including the at least one FIR filter adapted to filter the second plurality of lines of pixels that extends in the second direction and a horizontal FIR stage including the at least one FIR filter adapted to filter the plurality of lines of pixels that extends in the first direction, wherein the vertical FIR stage is before the horizontal FIR stage.

32. The apparatus of claim 30, wherein the plurality of FIR filters are coupled to receive an output from the common IIR stage, the fast repeated integral images filter further comprising a second plurality of FIR filters coupled to receive the output from the common IIR stage.

33. The apparatus of claim 18, wherein the at least one IIR filter is coupled to receive the image data stored in the storage unit through the data bus and the at least one FIR filter is coupled to output a partially filtered image data to the storage unit through the data bus.

34. An apparatus comprising:
means for receiving image data comprising an array of pixels;
means for performing repeated integral image filtering on the image data, wherein the means for performing repeated integral image filtering comprises:
means for performing at least one infinite impulse response (IIR) filter and at least one finite impulse response (FIR) filter on a first plurality of lines of pixels in the image data that extends in a first direction;
means for performing at least one IIR filter and at least one FIR filter on a second plurality of lines of pixels that extends in a second direction that is different than the first direction to produce a filtered image data; and
means for storing the filtered image data.

35. The apparatus of claim 34, wherein the means for performing the at least one IIR filter and the at least one FIR filter on the first plurality of lines of pixels in the image data produces a partially filtered image data, the apparatus further comprising means for storing the partially filtered image data, and wherein the second plurality of lines of pixels is from the partially filtered image data.

36. The apparatus of claim 34, wherein:
the means for performing the at least one IIR filter and the at least one FIR filter on the first plurality of lines of pixels comprises means for performing a plurality of IIR filters and a plurality of FIR filters on the first plurality of lines of pixels; and
the means for performing the at least one IIR filter and the at least one FIR filter on the second plurality of lines of pixels comprises means for performing a plurality of IIR filters and a plurality of FIR filters on the second plurality of lines of pixels.

37. The apparatus of claim 36, further comprising means for locally storing an output of each of the plurality of IIR filters and each of the plurality of FIR filters, the means for locally storing is different than the means for storing the filtered image data.

38. The apparatus of claim 36, wherein:
the means for performing the plurality of IIR filters and the plurality of FIR filters on the first plurality of lines of pixels performs the plurality of IIR filters and the plurality of FIR filters serially; and
the means for performing the plurality of IIR filters and the plurality of FIR filters on the second plurality of lines of pixels performs the plurality of IIR filters and the plurality of FIR filters serially.

39. The apparatus of claim 36, wherein:
the means for performing the plurality of IIR filters and the plurality of FIR filters on the first plurality of lines of pixels comprises a plurality of parallel IIR filters combined into a single higher-order IIR filter and a plurality of parallel FIR filters combined into a single higher-order FIR filter, wherein the single higher-order IIR filter is performed in series with the single higher-order FIR filter.

40. The apparatus of claim 36, wherein the means for performing the plurality of IIR filters and the plurality of FIR filters on the first plurality of lines of pixels and the means for performing the plurality of IIR filters and the plurality of FIR filters on the second plurality of lines of pixels comprises means for performing the plurality of IIR filters on the first plurality of lines of pixels and the plurality of IIR filters on the second plurality of lines of pixels in a common IIR stage that is before the means for performing the plurality of FIR filters on the first plurality of lines of pixels and the means for performing the plurality of FIR filters on the second plurality of lines of pixels.

41. The apparatus of claim 40, wherein the means for performing the plurality of FIR filters on the second plurality of lines of pixels is before the means for performing the plurality of FIR filters on the first plurality of lines of pixels.

42. The apparatus of claim 40, further comprising a means for performing a second plurality of FIR filters on the first plurality of lines of pixels and means for performing a second plurality of FIR filters on the second plurality of lines of pixels that is after the common IIR stage.

43. The apparatus of claim 34, wherein the means for performing the at least one IIR filter and the at least one FIR filter on the first plurality of lines of pixels in the image data and the means for performing the at least one IIR filter and the at least one FIR filter on the second plurality of lines of pixels use a single pass for the image data.

44. The apparatus of claim 43, wherein the image data comprises a first number of rows of pixels and a second number of columns of pixels, the apparatus further comprising means for dividing the image data into a plurality of stripes, each stripe comprising the first number of rows of pixels and a third number of columns of pixels that is less than the second number of columns, wherein the means for performing the at least one IIR filter and the at least one FIR filter on the first plurality of lines of pixels and the means for performing the at least one IIR filter and the at least one FIR filter on the second plurality of lines of pixels operate on each of the plurality of stripes sequentially.

45. A non-transitory computer-readable medium including program code stored thereon, comprising:

program code to receive image data comprising an array of pixels;

program code to perform repeated integral image filtering on the image data, wherein the program code to perform repeated integral image filtering comprises:

program code to perform at least one infinite impulse response (IIR) filter and at least one finite impulse response (FIR) filter on a first plurality of lines of pixels in image data that extends in a first direction program code to perform at least one IIR filter and at least one FIR filter on a second plurality of lines of pixels that extends in a second direction to produce a filtered image data, the second direction being different than the first direction; and program code to store the filtered image data.

46. The non-transitory computer-readable medium of claim 45, wherein the filtered image data approximates a Gaussian filtered image data.

47. The non-transitory computer-readable medium of claim 45, wherein the program code to perform the at least one IIR filter and the at least one FIR filter on the first plurality of lines of pixels produces a partially filtered image data, further comprising program code to output the partially filtered image data to a storage unit and wherein the at least one IIR filter and the at least one FIR filter is performed on the second plurality of lines of pixels from the partially filtered image data.

48. The non-transitory computer-readable medium of claim 45, wherein:

the program code to perform performing the at least one IIR filter and the at least one FIR filter on the first plurality of lines of pixels comprises a plurality of IIR filters and a plurality of FIR filters on the first plurality of lines of pixels; and the program code to perform the at least one IIR filter and the at least one FIR filter on the second plurality of lines of pixels comprises program code to perform a plurality of IIR filters and a plurality of FIR filters on the second plurality of lines of pixels.

49. The non-transitory computer-readable medium of claim 48, further comprising program code to locally store an output of each of the plurality of IIR filters and each of the plurality of FIR filters.

50. The non-transitory computer-readable medium of claim 48, wherein:

the program code to perform the plurality of IIR filters and the plurality of FIR filters on the first plurality of lines of pixels comprises program code to perform the plurality of IIR filters and the plurality of FIR filters serially; and the program code to perform the plurality of IIR filters and the plurality of FIR filters on the second plurality of lines of pixels comprises the program code to perform the plurality of IIR filters and the plurality of FIR filters serially.

51. The non-transitory computer-readable medium of claim 48, wherein:

the program code to perform the plurality of IIR filters and the plurality of FIR filters on the first plurality of lines of pixels comprises program code to combine a plurality of parallel IIR filters into a single higher-order IIR filter and to combine a plurality of parallel FIR filters into a single higher-order FIR filter and to perform the single higher-order IIR filter and the single higher-order FIR filter serially.

52. The non-transitory computer-readable medium of claim 48, wherein the program code to perform the plurality of IIR filters and the plurality of FIR filters on the first plurality of lines of pixels and the program code to perform the plurality of IIR filters and the plurality of FIR filters on the second plurality of lines of pixels comprises program code to perform the plurality of IIR filters on the first plurality of lines of pixels and to perform the plurality of IIR filters on the second plurality of lines of pixels in a common IIR stage and to perform the plurality of FIR filters on the second plurality of lines of pixels before performing the plurality of FIR filters on the first plurality of lines of pixels.

53. The non-transitory computer-readable medium of claim 45, further comprising program code to perform the at least one IIR filter and the at least one FIR filter on the first plurality of lines of pixels and the at least one IIR filter and the at least one FIR filter on the second plurality of lines of pixels in a single pass.

* * * * *